United States Patent
Oh et al.

(10) Patent No.: US 12,086,055 B2
(45) Date of Patent: Sep. 10, 2024

(54) METHOD FOR AUTOMATICALLY PRUNING SEARCH SPACE OF SYMBOLIC EXECUTION VIA MACHINE LEARNING

(71) Applicant: Korea University Research and Business Foundation, Seoul (KR)

(72) Inventors: Hakjoo Oh, Seoul (KR); Sooyoung Cha, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 421 days.

(21) Appl. No.: 17/496,012

(22) Filed: Oct. 7, 2021

(65) Prior Publication Data

US 2022/0107884 A1 Apr. 7, 2022

(30) Foreign Application Priority Data

Oct. 7, 2020 (KR) .................. 10-2020-0129186
Sep. 15, 2021 (KR) .................. 10-2021-0122949

(51) Int. Cl.
*G06F 9/44* (2018.01)
*G06F 11/36* (2006.01)
*G06F 17/16* (2006.01)

(52) U.S. Cl.
CPC ...... *G06F 11/3688* (2013.01); *G06F 11/3676* (2013.01); *G06F 17/16* (2013.01)

(58) Field of Classification Search
None
See application file for complete search history.

(56) References Cited

U.S. PATENT DOCUMENTS

| | | | | |
|---|---|---|---|---|
| 2015/0293831 A1* | 10/2015 | Li | ............... | G06F 11/36 717/124 |
| 2015/0331786 A1* | 11/2015 | Wiggers | ............. | G06F 11/3676 714/38.1 |
| 2015/0339217 A1* | 11/2015 | Avgerinos | ........... | G06F 11/3688 717/131 |

OTHER PUBLICATIONS

Jiang et al., CN 108595341, English text (Year: 2018).*
CN 109117364, English text (Year: 2019).*
Chat et al., Enhancing Dynamic Symbolic Execution by Automatically Learning Search Heuristics, (Year: 2019).*

* cited by examiner

*Primary Examiner* — Insun Kang
(74) *Attorney, Agent, or Firm* — NSIP Law

(57) ABSTRACT

A symbolic execution device, a symbolic execution method, and a probability distribution update method for symbolic execution are provided. The symbolic execution device includes a storage unit for storing at least one of a first probability distribution and a second probability distribution and a processor for sampling and obtaining a weight vector from the first probability distribution, for sampling and obtaining a removal rate from the second probability distribution, for adding the weight vector to at least one feature vector obtained from at least one candidate state to obtain a score for each of the at least one candidate state, and for selecting a state to be removed from among the at least one candidate state by using the score of each of the at least one candidate state and the removal rate.

13 Claims, 6 Drawing Sheets

METHOD FOR AUTOMATICALLY PRUNING SEARCH SPACE OF SYMBOLIC EXECUTION VIA MACHINE LEARNING

CROSS-REFERENCE TO RELATED APPLICATIONS

A claim for priority under 35 U.S.C. § 119 is made to Korean Patent Application No. 10-2020-0129186 filed on Oct. 7, 2020 and Korean Patent Application No. 10-2021-0122949 filed on Sep. 15, 2021, in the Korean Intellectual Property Office, the entire contents of which are hereby incorporated by reference.

BACKGROUND

Embodiments of the inventive concept described herein relate to a method for automatically pruning a search space using machine learning in symbolic execution.

Program testing is the task of detecting and confirming a defect in a given program, and verifying quality of the program based thereon. Among the program testing techniques, there is symbolic execution. The symbolic execution is a technique for testing a program by systematically searching for multiple states (for example, execution paths) in the program using a symbol rather than a specific value as an input value, and more specifically, is performed by repeatedly performing a process of selecting, executing, and forking any one of each state while maintaining each execution path for a given test time. The symbolic execution is widely used because it has the advantage of effectively increasing code coverage within a given time and improving the quality of a corresponding program by detecting various errors. However, the symbolic execution has the advantage of being able to test the program more effectively compared to other test methods, for example, random testing, but as the size of the program increases, the execution path to be searched increases exponentially, that is, state-explosion problem. For example, when the program has 5,000 branches, then the maximum number of execution paths (i.e., states) that need to be explored is 2 to 5000 powers. In particular, a device performing symbolic execution records as many candidate states as possible in a storage memory device during a test to avoid loss of important states, and therefore the memory capacitor of the device is often exceeded due to the state explosion problem. Therefore, to solve the problem of exceeding the memory capacity, a test may be performed by randomly removing a plurality of candidate states, but this causes a problem of lowering accuracy of program analysis. Conversely, when many candidate states are maintained in the symbolic execution process to improve accuracy, problems in which it becomes more and more difficult to determine an appropriate state in terms of code coverage improvement or error detection may occur, in addition to the problem of exceeding memory capacity.

SUMMARY

Embodiments of the inventive concept provide a symbolic execution device, a symbolic execution method, and a probability distribution update method for the symbolic execution which may reduce overall number of candidate states in the symbolic execution while maintaining the candidate states necessary for analysis.

Embodiments of the inventive concept provide a symbolic execution device, a symbolic execution method, and a probability distribution update method for the symbolic execution.

According to an exemplary embodiment, a symbolic execution device includes a storage unit for storing at least one of a first probability distribution and a second probability distribution and a processor for sampling and obtaining a weight vector from the first probability distribution, for sampling and obtaining a removal rate from the second probability distribution, for adding the weight vector to at least one feature vector obtained from at least one candidate state to obtain a score for each of the at least one candidate state, and for selecting a state to be removed from among the at least one candidate state by using the score of each of the at least one candidate state and the removal rate.

According to an exemplary embodiment, a symbolic execution method includes sampling and obtaining a weight vector from a first probability distribution, adding the weight vector to at least one feature vector obtained from at least one candidate state to obtain a score for each of the at least one candidate state, sampling and obtaining a removal rate from a second probability distribution, and selecting a state to be removed from among the at least one candidate state by using the score of each of the at least one candidate state and the removal rate.

According to an exemplary embodiment, a probability distribution update method includes generating reachability information data from at least one test case obtained in symbolic execution, extracting selection data to be used for update from the reachability information data, and updating at least one of a first probability distribution and a second probability distribution using the selection data, wherein the reachability information data includes at least one branch reachable by the at least one test case and the selection data includes a subset of the reachability information data having the smallest number of data reachable for all branches in a program.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, sub-parts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

Hereinafter, a symbolic execution device will be described with reference to an embodiment shown in FIGS. 1 to 4.

Figure 1:
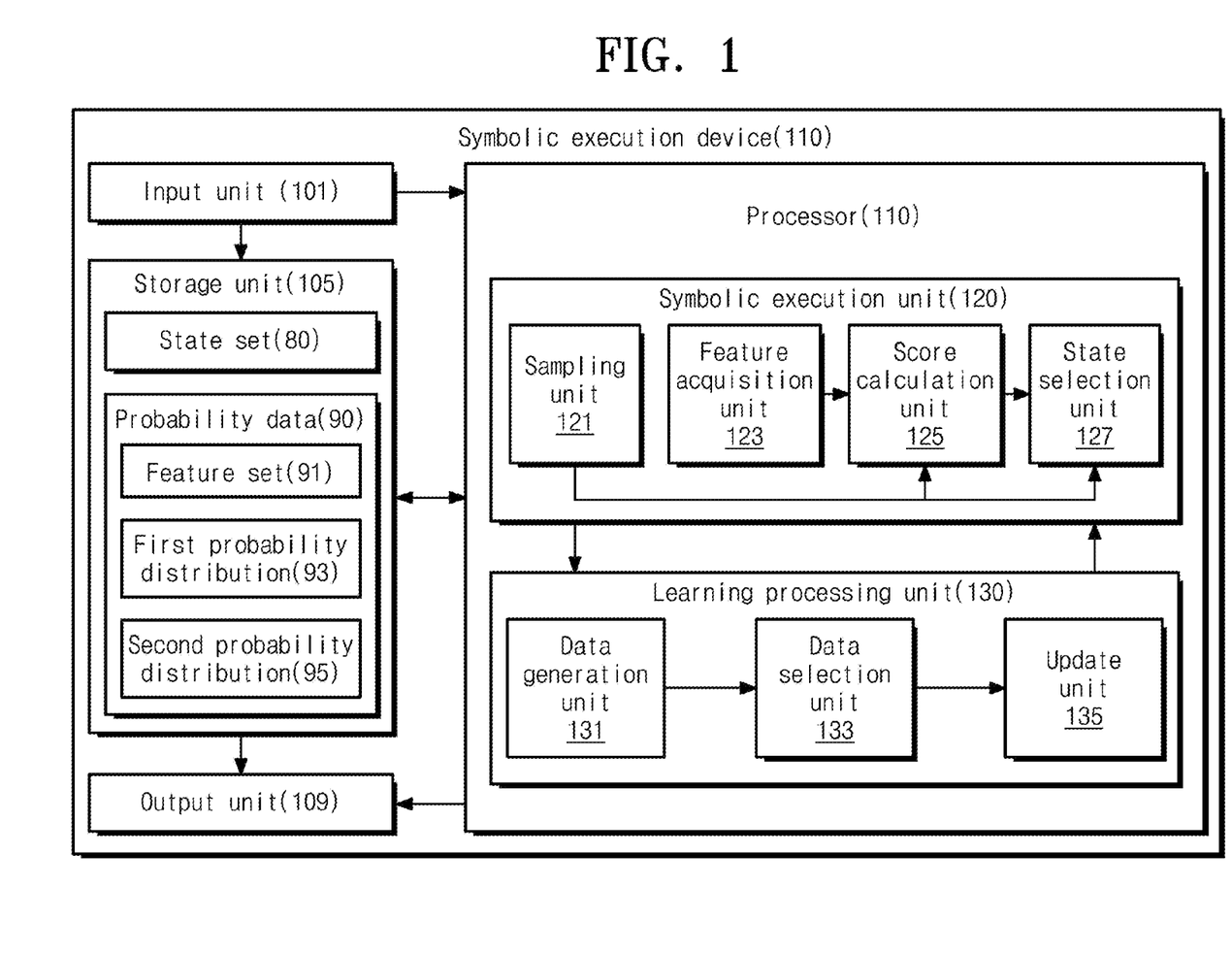
FIG. 1 is a block diagram of an embodiment of a symbolic execution device.
Figure 2:
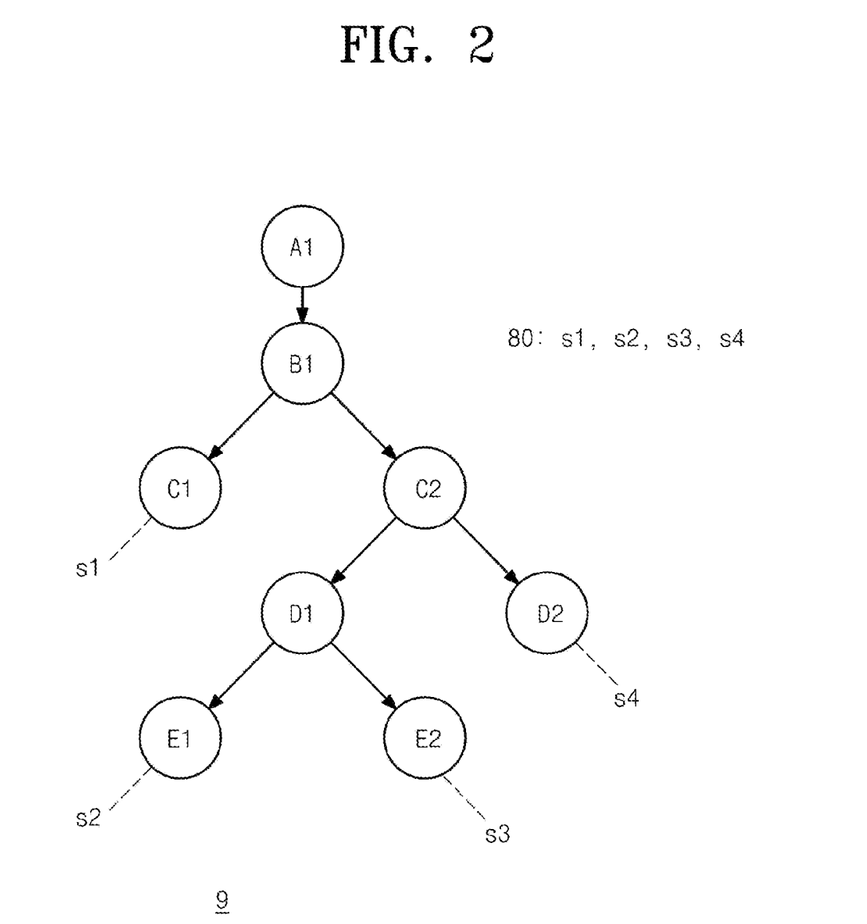
FIG. 2 is a diagram for describing a state set.

FIG. 1 is a block diagram of an embodiment of a symbolic execution device, and FIG. 2 is a diagram for describing a state set.

As shown in FIG. 1, a symbolic execution device 100 may include a processor 110 for performing symbolic execution, and may further include at least one of an input unit 101, a storage unit 105, and an output unit 109. Here, at least two of the input unit 101, the storage unit 105, the output unit 109, and the processor 110 may be electrically connected to each other to transmit or receive data or commands The input unit 101 may obtain at least one instruction/command related to an operation of the symbolic execution device 100, at least one data required for the operation of the symbolic execution device 100, program to be analyzed (hereinafter, referred to as the target program (9)), or at least one software (which may be referred to as a program, an app, or an application, etc.) executed by the processor 110, and may transmit the obtained instruction/command, data or program to the storage unit 105 or the processor 110. For example, the input unit 101 may obtain at least one of a state set 80 and probability data 90 by a user's manipulation or through transmission from an external device. The input unit 101 may include a keyboard, a mouse, a tablet, a touch screen, a touch pad, a track ball, a track pad, a scanner device, an image capturing module, an ultrasonic scanner, a motion detection sensor, a vibration sensor, a light receiving sensor, and a proximity sensor, and/or a microphone, may include a data input/output terminal capable of receiving data from another external device (e.g., a portable memory device, etc.), and may include a communication module (e.g., a LAN card, a short-distance communication module, or a mobile communication module, etc.) connected through a wired/wireless communication network to other external information processing devices. The input unit 101 may be provided integrally with the symbolic execution device 100 or may be provided to be physically detachable.

The storage unit 105 may include at least one of a main memory device (such as a ROM or RAM) and an auxiliary memory device (such as an optical disk, a hard disk, or a flash memory (which may include a solid state drive or a memory card)), according to embodiments. Also, the storage unit 105 may temporarily or non-temporarily store at least one data required for symbolic execution. For example, the storage unit 105 may store at least one of the state set 80 and the probability data 90.

The state set 80 may be a set of one or more states s1 to s4 as shown in FIG. 2, and may include a series of execution paths in which one or more states s1 to s4 may each be processed when executing any one target program 9. That is, the state set 80 may be a set of one or more execution paths. Specifically, for example, when any one target program 9 includes at least one statement A1 to E2 and the at least one statement A1 to E2 includes one or more branches B1, C2, and D1, the corresponding target program 9 is executed. When any one of the branches B1, C2 and D1 is reached in the execution process, specific statements C1 or C2, D1 or D2, E1 or E2 are sequentially executed and processed. Accordingly, depending on whether the condition is satisfied and the execution based thereon, the target program 9 has various execution paths (e.g., A1-B1-C1, A1-B-C2-D1-E1, A1-B-C2-D1-E2, Al-B1-C2-D2, etc.). Each of the states s1 to s4 in the state set 80 may be defined to include each of these execution paths (e.g., Al-B1-C1,A1-B1-C2-D1-El, A1-B1-C2-D1-E2, A1-B1-C2-D2, etc.). Hereinafter, in describing one or more states s1 to s4 in the target program 9, each of the states s1 to s4 to be determined whether to remove or not is referred to as a candidate state. According to an embodiment, the candidate state(s) may include all the states s1 to s4 in the target program 9 or only some of all the states s1 to s4 in the program 9. Hereinafter, a case in which all the states s1 to s4 in the target program 9 are candidate states will be described as an example, but the following to be described may be applied in the same or partially modified form when some states s1 to s4 are candidate states.

The probability data 90 is data for determining, in symbolic execution, one or more states in the target program 9 in the processor 110, for example, a symbolic execution unit 120, that is, a state to be removed (hereinafter, referred to as a to-be-removed state) from among the candidate states s1 to s4. According to an embodiment, the probability data 90 may be obtained from the outside (e.g., another device or user) through the input unit 101, and/or learning processing result of a learning processing unit 130 of the processor 110 or a feature vector processing of the symbolic execution unit 120. According to an embodiment, the probability data 90 may include at least one of a feature set 91, a first probability distribution 93, and a second probability distribution 95.

The feature set 91 means a set of features for expressing the states of each of the candidate states s1 to s4, and may mean a set of feature vectors according to an embodiment.

The feature may be defined as a value depending on whether a specific branch condition exists in a path condition expression of a specific candidate state s1 to s4, for example, a value of true "1" or false "0". Here, the path conditional expression means a set of branches B1, C2, and D1 through which a specific candidate state s1 to s4 has passed. More specifically, for example, when a path condition expression of any one state s1 to s4 is given as a set $\{(\alpha>10), (\beta==5), (\alpha>=5)\}$, any one feature indicates whether a specific branch condition (e.g., $\alpha<8$) is included in the path condition expression. Here, the specific branch condition $\alpha<8$ as an example is not included in the path condition expressions $\{(\alpha>10), (\beta==5), (\alpha>=5)\}$, and thus the feature has a value of "0". When the feature is expressed as an equation, it may be given as in Equation 1 below.

$$feat_i(s) = \begin{cases} 1 & \text{If } (\phi_i \in \Phi) \\ 0 & \text{otherwise} \end{cases} \quad \text{[Equation 1]}$$

In Equation 1, "feat,( )" denotes a feature corresponding to "i" ("i" is an integer greater than or equal to "0"), "s" denotes each state, "$\phi_i$," denotes a specific branch condition corresponding to "i", and "$\Phi$" denotes a path condition expression.

The feature vector refers to a vector generated by combining the above-described features. Specifically, for example, the feature vector may be obtained, when a set "F" of "n" features, that is, a feature set 91, is given, by transforming each state s1 to s4 into an n-dimensional vector as shown in Equation 2 below ("n" is a natural number greater than or equal to "1").

$$feat(s) = <feat_1(s), feat_2(s) \, feat_n(s)> \quad \text{[Equation 2]}$$

The first probability distribution 93 means a probability distribution for a weight ("$\theta$", which may include a weight vector) for calculating the significant degree (probability degree) of each of the states s1 to s4. The second probability distribution 95 means a probability distribution for a rate (hereinafter, a removal rate "r") for determining how many candidate states to remove. The first probability distribution 93 and the second probability distribution 95 may be obtained or updated by learning by the learning processing unit 130 of the processor 110. A detailed description of the first probability distribution 93 and the second probability distribution 95 will be described later.

Also, the storage unit 105 may store software necessary for symbolic execution. The software stored in the storage unit 105 may be directly written by a designer and stored in the storage unit 105, may be installed, stored, and modified after being delivered from a recording medium such as a memory device (memory card, etc.) or DVD, and/or may be obtained or updated through an electronic software distribution network accessible through a wired or wireless communication network.

The output unit 109 may transmit the processing result of the symbolic execution device 100 or various data or algorithms obtained during the processing to the outside. For example, the output unit 109 may allow a user of the like to check the processing result or process by visually or audibly expressing the input program 9, the state set 80 stored in the storage unit 105, the probability data 90 obtained by the learning processing unit 130, the states obtained based on the processing of the symbolic execution unit 120, and errors detected based on the obtained states. In addition, the output unit 109 may transmit the obtained probability data 90 to another external device and may perform an operation of the symbolic execution unit 120 as will be described later, using the probability data 90 received by another external device. The output unit 109 may include, for example, a display, a printer device, a speaker device, an image output terminal, a data input/output terminal, and/or a communication module, but is not limited thereto. According to an embodiment, the output unit 109 may be provided integrally with the symbolic execution device 100 or may be provided to be physically detachable.

According to an embodiment, the processor 110 may erase all or some of the to-be-removed states among the plurality of states s1 to s4 using the state set 80 and probability data 90, and/or may perform learning processing on the first probability distribution 93 and the second probability distribution 95 among the probability data 90. The processor 110 may drive one or more predetermined software stored in the storage unit 105 to perform the operation(s) of the processor 110. The processor 110 may include, for example, a central processing unit (CPU), a micro controller unit (MCU), an application processor (AP), an electronic control unit (ECU), a baseboard management controller (BMC), a micro processor (Micom), and/or at least one electronic device capable of performing various calculations and control processing in addition to the above. These may be implemented, for example, by using one or more semiconductor chips, circuits, or related components alone or in combination.

According to an embodiment, the processor 110 may include the symbolic execution unit 120, may include the learning processing unit 130, and may include both the symbolic execution unit 120 and the learning processing unit 130.

The symbolic execution unit 120 may determine a to-be-removed state from among all candidate states s1 to s4 using the state set 80 and the probability data 90, may remove a removal target state from all candidate states s1 to s4 if necessary, and may obtain and output the result. According to an embodiment, the symbolic execution unit 120 may include a sampling unit 121, a feature acquisition unit 123, a score calculation unit 125, and a state selection unit 127.

The sampling unit 121 may sample and obtain the weight vector "$\theta$" from the first probability distribution 93, and simultaneously or sequentially, sample and obtain the removal rate "r" from the second probability distribution 95. For example, the sampling unit 121 obtains the weight vector "$\theta$" and the removal rate "r" from the respective probability distributions 93 and 95 as described in Equations 3 and 4 below.

$$\text{Sample}(P_{stgy}) = <0.3, -0.4, 0.6, 0.1> \quad \text{[Equation 3]}$$

$$\text{Sample}(P_{ratio}) = 50\% \quad \text{[Equation 4]}$$

In Equation 3, "$P_{stgy}$" means the first probability distribution 93, and in Equation 4, "$P_{ratio}$" means the removal rate "r". Each value of the right side of Equations 3 and 4 is an example of sampled weight vector "$\theta$" and removal rate "r".

The weight vector "$\theta$" and the removal rate "r" obtained by the sampling unit 121 may be transmitted to the score calculation unit 125 and the state selection unit 127, respectively.

The feature acquisition unit 123 may obtain each candidate state s1 to s4 (hereinafter, first to fourth candidate states) in the state set 80, which is transformed into at least one feature vector feat(s1) to feat(s4) corresponding to each candidate state s1 to s4. Specifically, the feature acquisition unit 123 may obtain "n" features as described in Equation 1 and combine them to obtain a feature vector as described in Equation 2. As described in Equation 1, where each of the feature vectors feat(s1) to feat(s4)) indicates whether the path conditional expression of the corresponding state s1 to s4 contains a branch condition corresponding to a certain feature, for example, when the feature vector feat(s_1)) corresponding to the first state s1 is <1, 0, 0, 1>, it means that the path conditional expression of the first state s 1 includes a branch condition corresponding to the first feature and a branch condition corresponding to the fourth feature, as described in Equation 5 below.

feat($s_1$):<1, 0, 0, 1> feat($s_2$):<1, 1, 0, 0> feat($s_3$):<0, 0, 0, 1> feat($s_4$):<1, 0, 1, 0>     [Equation 5]

As described in Equation 5, the feature acquisition unit 123 may obtain one or more feature vectors feat(s1) to feat(s4) corresponding to each state s1 to s4. The obtained at least one feature vector feat(s1) to feat(s4) may be transmitted to the score calculation unit 125. The feature vectors feat(s1) to feat(s4) obtained by the feature acquisition unit 123 may be temporarily or non-temporarily stored in the storage unit 105. In this case, the feature vectors feat(s1) to feat(s4) may be stored in the storage unit 105 in the form of a feature set 91.

The score calculation unit 125 may obtain one or more scores corresponding to each of the candidate states s1 to s4 based on the feature vectors feat(s1) to feat(s4) corresponding to each state and the weight vector "θ" obtained by the sampling unit 121. For example, the score calculation unit 125 obtain a score for each state s1 to s4 by calculating the dot product between the feature vectors feat(s1) to feat(s4) and the weight vector "θ", as described in Equation 6 below.

score($s$,θ)=feat($s$)·θ     [Equation 6]

In Equation 6, "s" means a state. More specifically, for example, when a weight vector "θ" is given as in Equation 3, and each feature vector feat(s) corresponding to each candidate state s1 to s4 is given as a four-dimensional value as in Equation 5, a score corresponding to the first candidate state s1 may be given as 0.4 based on a dot product of <1, 0, 0, 1> and <0.3, −0.4, 0.6, 0.1>, and a score corresponding to the second candidate state s2 may be given as −0.1 based on a dot product of <1, 1, 0, 0> and <0.3, −0.4, 0.6, 0.1>. In addition, a score corresponding to the third candidate state s3 may be given as 0.1 based on a dot product of <0, 0, 0, 1> and <0.3, −0.4, 0.6, 0.1>, and a score corresponding to the fourth candidate state s4 may be given as 0.9 based on a dot product of <1, 0, 1, 0> and <0.3, −0.4, 0.6, 0.1>.

The scores corresponding to the candidate states s1 to s4 obtained by the score calculation unit 125 may be transmitted to the state selection unit 127.

The state selection unit 127 may select a to-be-removed state based on a score corresponding to each of the candidate states s1 to s4. According to an embodiment, the state selection unit 127 may determine a removal target state based on the removal rate "r". For example, the state selection unit 127 may calculate the number of removals by multiplying the number of all candidate states s1 to s4 by the removal rate "r" and may determine as many candidate states as the number of removals from among all candidate states s1 to s4 as the removal target state. Here, the state selection unit 127 may determine a candidate state having a relatively low score among all the candidate states s1 to s4 as the removal target state. As described in Equation 4, when the removal rate "r" is 50%, a candidate state whose score is the lower 50% among all candidate states s1 to s4 is determined as the removal target state. As described above, when the scores corresponding to each of the first to fourth candidate states s1 to s4 are given as 0.4, −0.1, 0.1, and 0.9, respectively, and the removal rate "r" is set to 50%, the two candidate states corresponding to the lower 50% among the four candidate states s1 to s4 may be determined to be removed, and second and third candidate states s2 and s3 with relatively low scores among the four candidate states s1 to s4 may be selected as the removal target state.

The overall operation flow of the above-described symbolic execution unit 120 may be expressed as a function (PRUNE(S,P)) of Equation 7 below.

$$\text{PRUNE}(S, P) = \underset{S_p \subseteq S \wedge |S_p|=|S| \times r}{\text{argmin}} \sum_{s \in S_p} \text{score}(s, \theta) \quad [\text{Equation 7}]$$

In Equation 7, "S" denotes a set of all candidate states, and "$S_p$" denotes a set of removal target states. "r", "s" and "θ" are the removal rate, state and weight vector, respectively. In this case, Equation 7 may be interpreted as giving a score for each candidate state "s" in the set "S" of all candidate states, and then removing the set "$S_p$" of the state to be removed consisting of k (=|S|xr) states with the lowest score, which is substantially the same as the operation of the symbolic execution unit 120.

Meanwhile, candidate states (e.g., the first and fourth candidate states s1 and s4) other than the removal target state may be transmitted to the learning processing unit 130 as test cases $t_1$ and $t_4$.

The learning processing unit 130 may learn and update the probability data 90, and transmit the updated probability data 90 to the storage unit 105 or the symbolic execution unit 120. In this case, the learning processing unit 130 may learn and update at least one of the first probability distribution 93 and the second probability distribution 95 among the probability data 90. The learning processing unit 130 may include a data generation unit 131, a data selection unit 133, and an update unit 135, according to an embodiment.

The data generation unit 131 may receive the test case(s) generated by the symbolic execution unit 120 and/or used by the symbolic execution unit 120, and evaluate the received test case(s). Specifically, the data generation unit 131 receives a test case set "T" generated by the symbolic execution unit 120 until the corresponding point in time, and evaluates how many of each element (i.e., the test case "t") in the test case set "T" or which branch (e.g., B1, C2, D1, E1 in FIG. 2) is reached.

For example, when the test case set "T" has four test cases $t_1$, $t_2$, $t_3$, $t_4$ as elements, this may be expressed by Equation 8 below.

$T=\{t_1, t_2, t_3, t_4\}$     [Equation 8]

Here, the data generation unit 131 may extract at least one branch reachable by each test case $t_1$, $t_2$, $t_3$, $t_4$ for each test case $t_1$, $t_2$, $t_3$, $t_4$, and may generate at least one data "D" (hereinafter, reachability information data) by combining the extracted at least one branch with a corresponding test case $t_1$, $t_2$, $t_3$, $t_4$. The reachability information data "D" may be defined as a set of information about one or more branch reachable by each test case $t_1$, $t_2$, $t_3$, and $t_4$. More specifically, for example, when the set "B" of branch(s) existing in the program is B={$b_1$, $b_2$, $b_3$, $b_4$, $b_5$, $b_6$} ($b_1$, $b_2$, $b_3$, $b_4$, $b_5$, and $b_6$ correspond to each branch), and the data generation unit 131 may generate at least one reachability information data "D" based on the test case set "T" and a branch set "B" as shown in Equation 9 below.

$$D=\{(t_1, \{b_1, b_2, b_4\}), (t_2, \{(b_2, b_3, b_5\}), (t_3, \{b_4, b_6\}), (t_1, \{b_1, b_2, b_3, b_4\})\}$$ [Equation 9]

As described in Equation 9, the reachability information data "D" may include a number of elements (e.g., 4) corresponding to the number of test cases $t_1$ to $t_4$ and each element may be prepared to have corresponding each test case $t_1$ to $t_4$ to the branch(s) $b_1$, $b_2$, $b_3$, $b_4$, $b_5$, $b_6$ reachable to each test case $t_1$ to $t_4$. the reachability information data "D" of Equation 9 may show that the first test case $t_1$ may reach three branches $b_1$, $b_2$, and $b_4$, the second test case $t_2$ may reach three branches $b_2$, $b_3$, and $b_5$, the third test case $t_3$ may reach the two branches $b_4$ and $b_6$, and the fourth test case $t_4$ may reach four branches $b_1$, $b_2$, $b_3$, and $b_4$.

The data selection unit 133 may select and extract data $D_{good}$ (hereinafter, selection data) to be used in the update process from the obtained reachability information data "D". Here, the selection data $D_{good}$ refers to a set having the smallest number of data reachable to all branches in the program, which are relatively various branches in the reachability information data "D" accumulated up to the corresponding point in time. That is, the selection data $D_{good}$ is a subset of the reachability information data "D" and refers to a set in which the number of data is relatively small compared to other subsets, and instead, all branches $b_1$, $b_2$, $b_3$, $b_4$, $b_5$, $b_6$ can be reached. That is, when all branches in the selection data (i.e., branches corresponding to each test case in the selection data) are combined, the set of all branches in the program may be the same. Specifically, for example, when the reachability information data "D" is given as in Equation 4, the subset having the smallest number of data reachable to all the branch $b_1$, $b_2$, $b_3$, $b_4$, $b_5$, $b_6$ that is, the selection data $D_{good}$, may be determined as shown in Equation 10 below.

$$D_{good}=\{(t_3, \{b_4, b_6\}), (t_4, \{b_1, b_2, b_3, b_5\})\}$$ [Equation 10]

The update unit 135 may update the probability distribution corresponding to each based on at least one of the weight vector "θ" and the removal rate "r" used by the symbolic execution unit 120, that is, the first probability distribution 93 and the second probability distribution 95 when generating test case(s) (hereinafter, referred to as selection test cases) belonging to selection data $D_{good}$. In this case, the update unit 135 may update the first probability distribution 93 and the second probability distribution 95 by assigning a relatively high probability to the weight vector "θ" and the removal rate "r", which have been used relatively frequently, when generating the selection test case by the symbolic execution unit 120. For example, the first probability distribution 93 may be configured to combine the same number of probability distributions as the dimension of the weight vector "θ" as described in Equation 11 below.

$$P_{stgy}=P_1 \times P_2 \times \ldots \times P_n$$ [Equation 11]

In Equation 11, "$P_{stgy}$" means the first probability distribution 93 as in Equation 3, and "Pi" (i.e., $P_1$ to $P_n$) which is a probability distribution that determines the i-th value of the weight vector "θ", for example, may include a truncated normal distribution having a maximum value of "1", a minimum value of "-1", an average of "μ", and a standard deviation of "σ", as shown in Equation 12.

$$P_i = N(\mu, \sigma, -1, 1)$$ [Equation 12]

Each probability distribution $P_1$ to $P_n$ may be updated based on a separately calculated mean and/or standard deviation, where the mean and/or standard deviation may be calculated using, for example, corresponding values (e.g., in the case of the i-th probability distribution, the i-th value(s) of the weight vector "θ") in the weight vector "θ" used to generate the selection test cases $t_3$ and $t_4$, respectively. In generating two selection test cases $t_3$ and $t_4$ corresponding to the selection data $D_{good}$, when the weight vector "θ" and the removal rate "r" used by the symbolic execution unit 120 are given by the following Equations 13 and 14, respectively, probability distribution Pi of the first value of the weight vector "θ" may be determined as in Equation 15 below using the first values 0.4 and 0.8 of each selection test case $t_3$ and $t_4$.

$$t_3 = (\langle 0.4, 0.2, -0.3 \rangle, 40\%)$$ [Equation 13]

$$t_4 = (\langle 0.8, 0.3, -0.5 \rangle, 60\%)$$ [Equation 14]

$$P_1 = N(\mu(\{0.4, 0.8\}), \sigma(\{0.4, 0.8\}), -1, 1)$$
$$= N(0.6, 0.2, -1, 1)$$ [Equation 15]

Equation 13 expresses an example of the weight vector "θ" and the removal rate "r" used in obtaining one selection case $t_3$, wherein the weight vector "θ" is given by <0.4, 0.2, -0.3> and the removal rate "r" represents a case of 40%. Equation 14 expresses an example of a weight vector "θ" and a removal rate "r" used to obtain another selection case $t_4$, wherein the weight vector "θ" is <0.8, 0.3, -0.5> and the removal rate "r" is 60%.

As described in Equation 15, a probability distribution (N(0.6, 0.2, -1, 1) with the value(s) 0.6 and 0.2 calculated using the first values 0.4 and 0.8 of the selection test cases $t_3$ and $t_4$, as their mean values and standard deviations, respectively N(0.6, 0.2, -1, 1), may be calculated. The first probability distribution $P_1$ may be updated by replacing the first probability distribution $P_1$ with the calculated probability distribution N(0.6, 0.2, -1, 1).

The second to n-th probability distributions $P_2$ to $P_n$, of Equation 11 may also be updated in the same manner.

The second probability distribution 95 is for increasing the probability of the removal rate "r" used to generate the selection test cases $t_3$ and $t_4$, for example, is for increasing the probability of the respective removal rates "r" of 40% and 60% as described in Equations 9 and 10. The second probability distribution 95 may also be updated in the same way as the first probability distribution 93 or in a partially modified form.

The above-described symbolic execution unit 120 and the learning processing unit 130 may be logically or physically separated according to an embodiment. When the symbolic execution unit 120 and the learning processing unit 130 are logically separated, they may be configured to use one physical processing device. When the symbolic execution unit 120 and the learning processing unit 130 are physically separated, they may be configured to use different physical processing devices. In addition, the sampling unit 121, the feature acquisition unit 123, the score calculation unit 125, and the state selection unit 127 of the symbolic execution unit 120 may be logically and/or physically divided, and the data generation unit 131, the data selection unit 133, and the update unit 135 of the learning processing unit 130 may also be logically and/or physically divided.

The above-described processor 110 may further perform other operations in addition to selection and removal of the removal target state for symbolic execution or updating of the probability data 90. For example, the above-described processor 110 may detect an error in the target program 9 by performing symbolic execution based on a set of candidate state(s) other than the removal target state.

The above-described symbolic execution device 100 may be implemented using a device specially designed to perform the above-described processing and/or control, or may be implemented by using one or more information processing devices alone or in combination. Here, the one or more information processing devices may include, for example, a desktop computer, a laptop computer, a server hardware device, a smart phone, a tablet PC, a smart watch, a smart band, a portable game machine, a head mounted display (HMD) Devices, navigation devices, remote controllers, digital televisions, set-top boxes, artificial intelligence sound reproduction devices (artificial intelligence speakers), home appliances (e.g., refrigerators or washing machines, etc.), moving objects (e.g., passenger cars, vehicles such as buses or two-wheeled vehicles, or mobile robots or wireless model vehicles, or unmanned moving objects such as robot vacuum cleaners), an air vehicle (such as an aircraft, a helicopter, or an unmanned aerial vehicle such as a drone), a robot (for domestic, industrial or military use), or a mechanical device (industrial or military), but is not limited thereto. In addition to the above-described information processing devices, considering the above-described symbolic execution device 100, at least one of various devices for arithmetic processing and control of information may be employed depending circumstances or conditions of a designer or a user.

Figure 3:
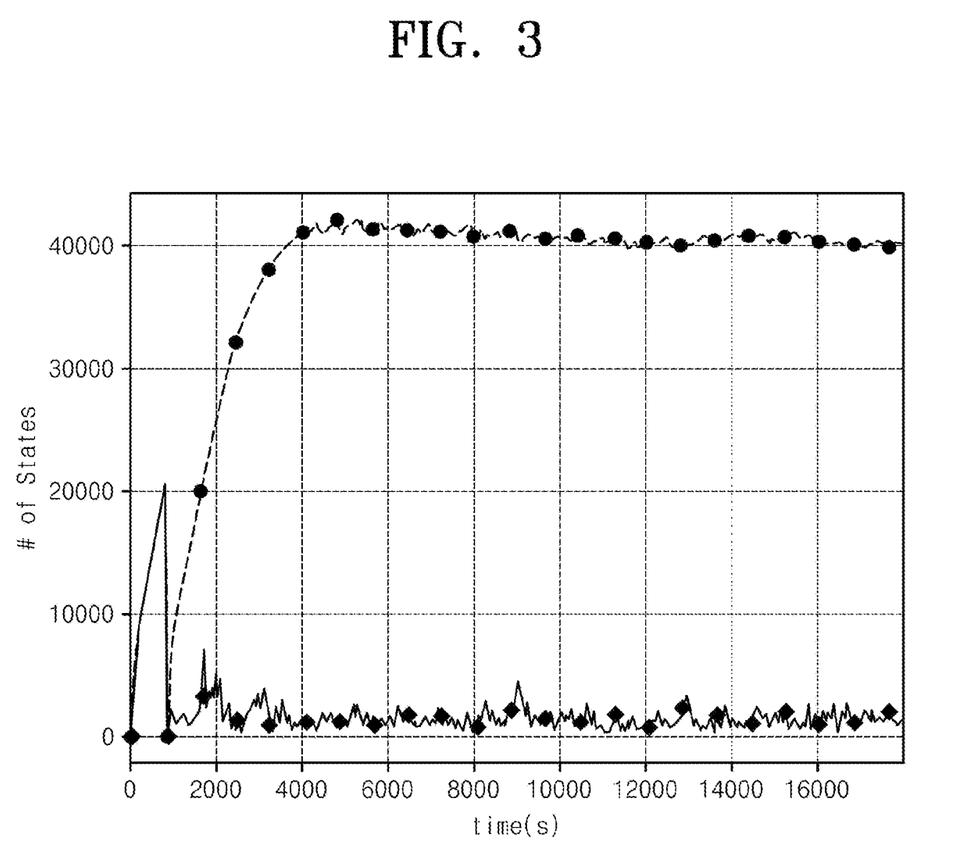
FIG. 3 is a graph chart comparing the number of candidate states of a symbolic execution device with the number of candidate states according to the conventional device.
Figure 4:
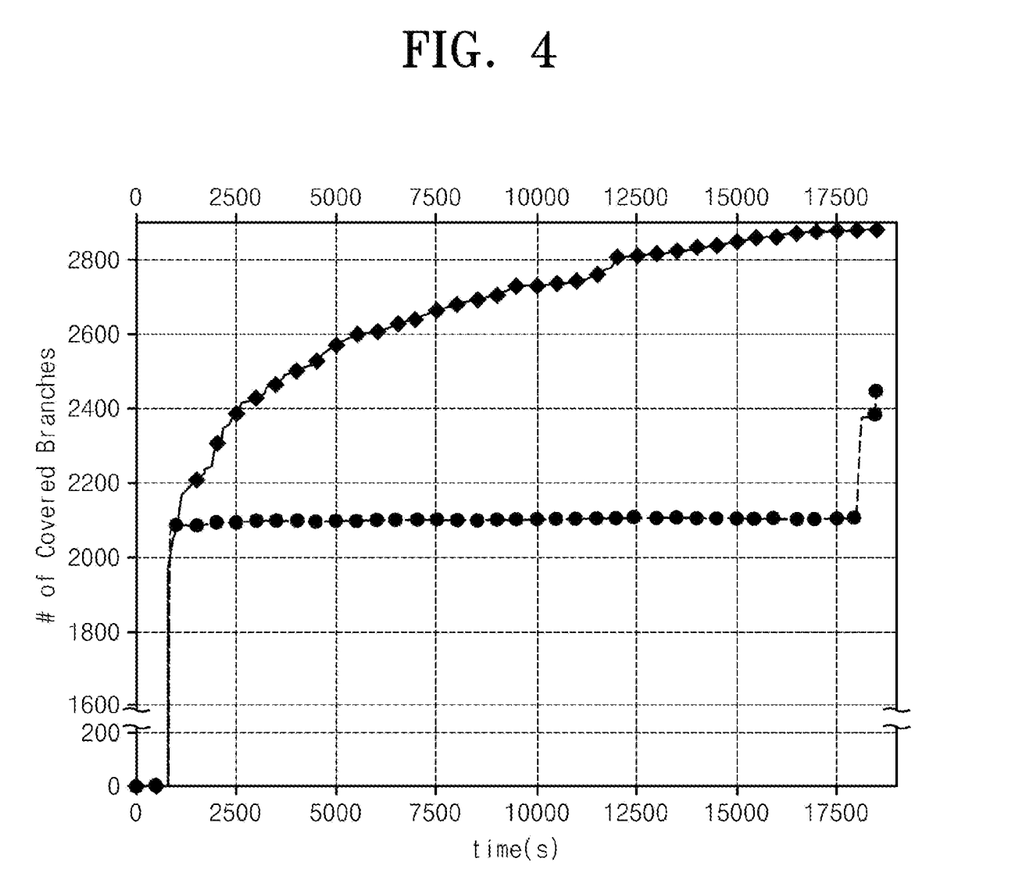
FIG. 4 is a graph chart comparing a branch processing range of a symbolic execution device and a branch processing range according to the conventional device.

Hereinafter, effect will be described by comparing the number of candidate states and branch processing coverage obtained by the above-described symbolic execution device with the conventional device.

FIG. 3 is a graph chart comparing the number of candidate states of a symbolic execution device with the number of candidate states according to the conventional device. In FIG. 3, an x-axis denotes time (seconds), and a y-axis denotes the number of states. In addition, a red line indicates candidate states processed by the above-described symbolic execution unit 100, and a green line indicates the number of candidate states processed by the conventional symbolic execution unit KLEE.

As shown in FIG. 3, in the case of the above-described symbolic execution device 100, it may be seen that the number of candidate states continues to increase at the beginning, but then rapidly decreases, and after a certain point in time (1000 seconds) elapses, approximately 2000 to 3000 candidate states are selected and the test is performed. On the other hand, in the case of the conventional symbolic execution device KLEE, the number of candidate states continuously increases, and from about 4000 seconds on, more than 40,000 candidate states are used for testing. Therefore, because the above-described symbolic execution device 100 performs a test such as symbolic execution using a relatively small number of candidate states, a problem of state explosion does not occur, and thus a problem of insufficient memory capacity does not occur.

FIG. 4 is a graph chart comparing a branch processing range of a symbolic execution device and a branch processing range according to the conventional device. In FIG. 4, an x-axis means time (seconds), and a y-axis means the processing range of a branch (i.e., code coverage). In addition, a red line indicates a processing range by the above-described symbolic execution device 100, and a green line indicates a processing range by the conventional symbolic execution device KLEE.

Referring to FIG. 4, the processing range of the above-described symbolic execution device 100 is continuously increasing over time, and it is possible to process more than 2800 branches after approximately 12,000 seconds. However, according to the conventional symbolic execution unit KLEE, the processing range hardly increases and is kept constant at about 2100 or less. That is, the above-described symbolic execution device 100 may process the branch in a wider range than the conventional symbolic execution device KLEE.

Therefore, as shown in FIGS. 3 and 4 together, the above-described symbolic execution device 100 may achieve relatively high branch coverage while maintaining a smaller number of candidate states compared to the conventional device. Thus, the efficiency of the test may be greatly improved.

Hereinafter, various embodiments of the symbolic execution method will be described with reference to FIG. 5.

Figure 5:
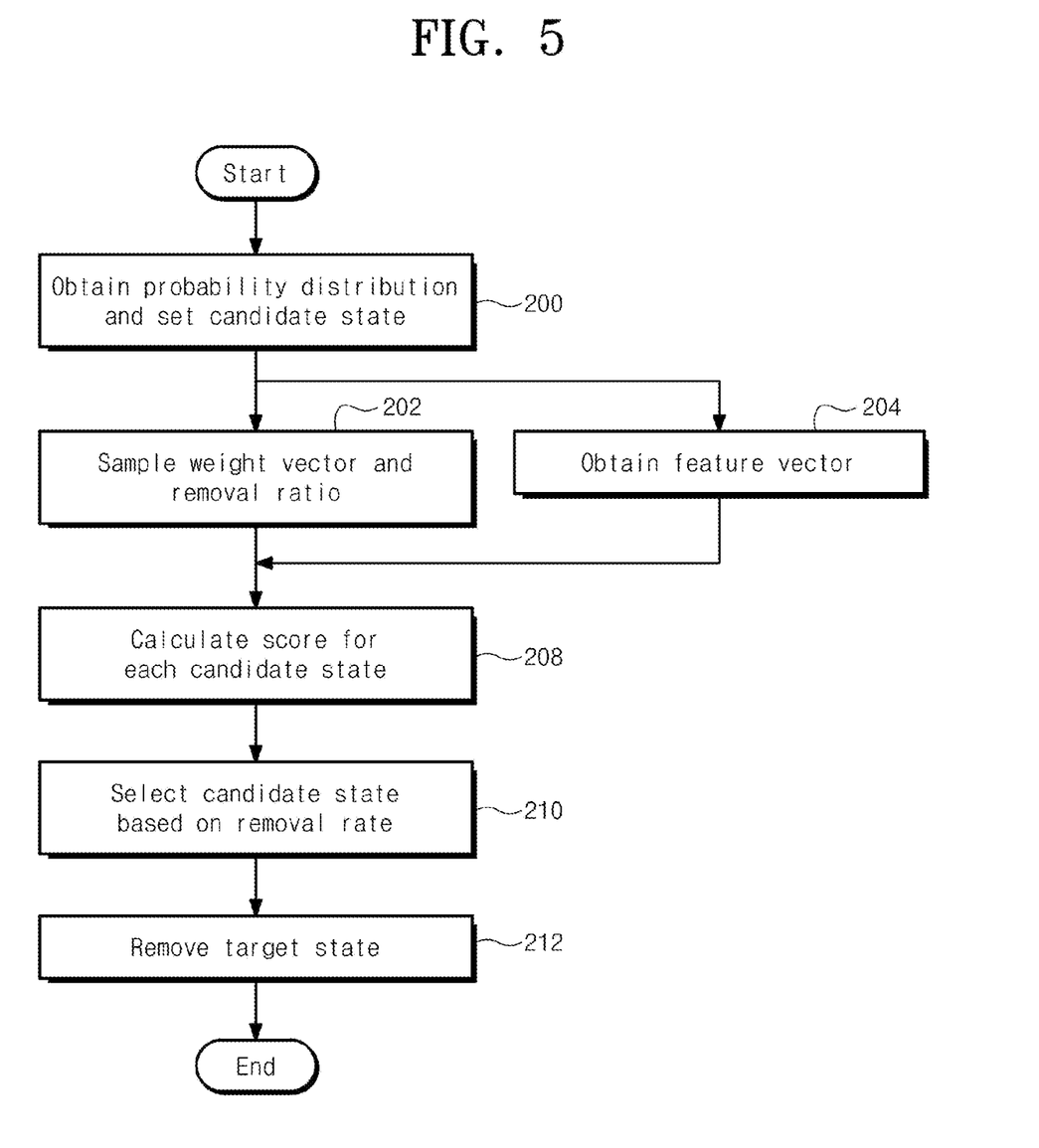
FIG. 5 is a flowchart of an embodiment of a symbolic execution method.

FIG. 5 is a flowchart of an embodiment of a symbolic execution method.

According to the embodiment shown in FIG. 5, a probability distribution (at least one of a first probability distribution and a second probability distribution) may be first obtained to perform the symbolic execution method, and then a state set may be obtained from a program in 200. Here, the probability distribution may be updated as described later with reference to FIG. 6. In addition, the state set may include at least one candidate state to be removed or not. The acquisition of the probability distribution and the acquisition of the state set may be performed simultaneously or sequentially.

Once a probability distribution is obtained, a weight vector and/or a removal rate may be sampled and obtained from the probability distribution in 202. Here, the weight vector may be obtained from the first probability distribution, and the removal rate may be obtained from the second probability distribution. For example, the weight vector and the removal rate may be sampled based on Equations 3 and 4 described above.

Meanwhile, each candidate state in the candidate state set may be obtained by being transformed into a feature vector in 204. The feature vector may be generated by combining one or more features as described in Equation 2, and each of the one or more characteristics may include a value indicating whether a specific branch condition exists in the path condition expression of any one state. For example, a feature may be set to a value of "1" or "0" as described in Equation 1. In this case, the feature vector is formed by a combination of values of "1" or "0" as in Equation 5. Depending on the embodiment, the transformation of 204 to a feature vector may be performed concurrently with the sampling of 202 of the weight vector and/or the removal rate, or may be performed sequentially. In the latter case, the transformation of 204 to a feature vector may be initiated either preceding or following the sampling of 202 of the vector and/or the removal rate.

Sequentially, a score for each candidate state may be calculated and obtained based on the feature vector and weight vector corresponding to each state in 208. According to an embodiment, a score for each candidate state may be defined as a result of a dot product operation between a feature vector and a weight vector of each candidate state as shown in Equation 6.

When the score corresponding to each candidate state is calculated, all or some candidate states among all candidate states may be determined as the removal target state based on the removal rate obtained by sampling from the second probability distribution in 210. In this case, the removal target may be selected based on a score, for example, may be a candidate state having a relatively low score. The number of candidate states (i.e., removal target states) to be removed (i.e., the number of removals) may be a value obtained by multiplying the number of all candidate state(s) by a removal rate. Accordingly, candidate state(s) up to the number of removals sequentially from the candidate state(s) with the lowest score are selected as the removal target state. For example, when the removal rate is 50%, a candidate state whose calculated score is in the lower 50% may be selected as a removal target.

Candidates to be removed may be removed from the entire candidate state in 212. Thereafter, the symbolic execution of the program may be performed based on the candidate state from which the candidate to be removed is removed. Here, the program to be the symbolic execution target may include a program for which a set of candidate states has been obtained. The candidate state from which the candidate to be removed is removed may be used to update the probability distribution in the form of a test case, as will be described later.

Hereinafter, a method for updating a probability distribution for symbolic execution will be described with reference to FIG. 6.

Figure 6:
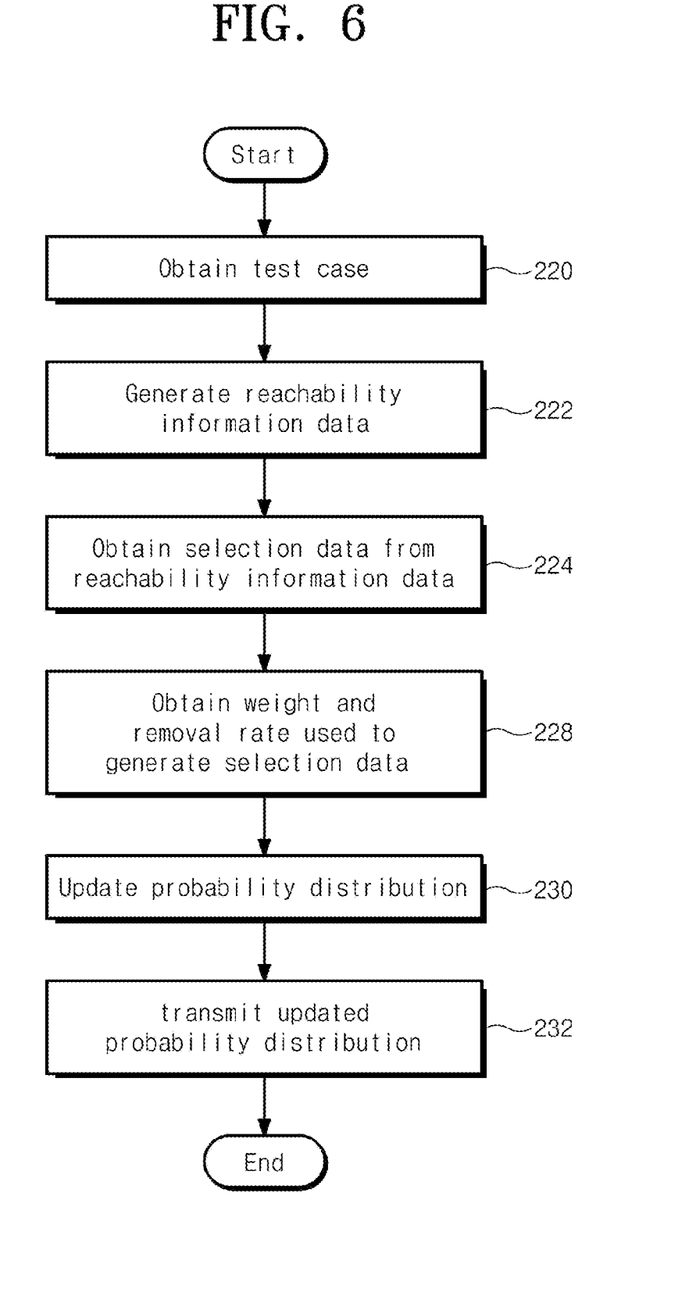
FIG. 6 is a flowchart of an embodiment of a method for updating a probability distribution for symbolic execution.

FIG. 6 is a flowchart of an embodiment of a method for updating a probability distribution for symbolic execution.

As shown in FIG. 6, according to an embodiment, first, at least one test case (set of test cases) used for symbolic execution may be obtained to perform the method for updating the probability distribution for symbolic execution in 220. The at least one test case may be obtained based on the symbolic execution process illustrated in FIG. 5, or may be input in advance by a user or a designer.

When a test case (or a set thereof) is obtained, reachability information data may be generated corresponding thereto. The reachability information data is data (set) indicating which branches each test case may reach. According to an embodiment, the reachability information data may be generated by correspondingly combining a branch that is reachable to each test case among a plurality of branches. Specifically, for example, as described in Equation 9, each test case may be composed of one element by combining reachable branch(s), and reachability information data may be generated by combining these elements.

When the reachability information data is generated in 222, selection data may be obtained from the reachability information data in 224. The selection data is data to be used to update the probability distribution, and more specifically, refers to a set with the smallest number of elements while reaching all branches in the program. That is, the set of all branches in the selection data (i.e., all of the branches corresponding to each test case in the selection data) may be the same as all branches in the program. The selection data may be a subset of reachability information data.

When the selection data is obtained, at least one of a weight vector and a removal rate used when generating a selection test case corresponding to the selection data may be obtained in 228.

Then, based on at least one of the weight vector and the removal rate of the obtained screening test case, a probability distribution corresponding to the weight vector (i.e., a first probability distribution) and a probability distribution corresponding to the removal rate (i.e., a second probability distribution) may be updated in 230. In this case, the first probability distribution and/or the second probability distribution may be updated by giving a relatively high probability to a weight vector and/or a removal rate that have been used relatively frequently. In more detail, the first probability distribution may be formed by a combination of a plurality of probability distributions as described in Equation 11, and the number of the plurality of probability distributions may be the same as the dimension of the weight vector. In this case, each of the plurality of probability distributions includes a normal distribution, for example, a truncated normal distribution with a maximum value of "1", a minimum value of "−1", a mean of "$\mu$", and a standard deviation of "$\sigma$" as shown in Equation 12. Here, the average and standard deviation of each of the plurality of probability distributions may be updated, and the average and standard deviation may be updated using a corresponding value of the weight vector "$\theta$". For example, the i-th probability distribution (i.e., $P_i$ corresponding to the i-th element of the weight vector may be updated using the value of the i-th element of the weight vector corresponding to the selection test case.

When the first probability distribution and/or the second probability distribution are updated, the updated first probability distribution and/or the updated second probability distribution may be used for a sampling of a weight vector and/or a removal rate in 232, in the symbolic execution method described with reference to FIG. 5 (in 220 and 202 of FIG. 5).

The symbolic execution method shown in FIG. 5 and the probability distribution updating method shown in FIG. 6 may both be performed by the same single information processing device, or may be performed other information processing devices physically separated from each other and provided to communicate with each other. In the latter case, for example, the symbolic execution method may be performed by a smart phone or a desktop computer, and the probability distribution updating method may be performed by a server hardware device connected to a smart phone or a desktop computer. In addition, the symbolic execution method shown in FIG. 5 may be performed by one or more homogeneous or heterogeneous information processing devices according to an embodiment, and the probability distribution updating method shown in FIG. 6 may also be performed by one or more homogeneous or heterogeneous information processing devices according to embodiments.

The symbolic execution method or the probability distribution update method for symbolic execution according to the above-described embodiment may be implemented in the form of a program that is capable of being driven by a computer device. The program may include instructions, libraries, data files and/or data structures alone or in combination, and may be designed and manufactured using machine code or high-level language code. The program may be specially designed to implement the above-described method, or may be implemented using various functions or definitions that are known and available to those skilled in the art of computer software. Also, here, the computer device may be implemented by including a processor or memory that enables the function of the program to be realized, and may further include a communication device if necessary. A program for implementing the symbolic execution method or the probability distribution updating method for symbolic execution may be recorded in a computer-readable recording medium. The computer-readable recording medium may include at least one type of physical storage medium capable of temporarily or non-temporarily storing one or more programs executed in response to the invocation, for example, a semiconductor storage medium such as a solid state drive (SSD), a ROM, a RAM, or a flash memory, a magnetic disk storage medium such as a hard disk or a floppy disk, an optical recording medium such as a compact disk or a DVD, or a magneto-optical recording medium such as a floptical disk.

Although the symbolic execution device, the symbolic execution method, and the probability distribution updating method for symbolic execution have been described above with reference to various embodiments, the symbolic execution device, the symbolic execution method, or the probability distribution updating method for symbolic execution are limited to the above-described embodiments only. Various other devices or methods that can be implemented by a person skilled in the art by modifying based on the above-described embodiment are also embodiments of the above-described symbolic execution device, symbolic execution method, or probability distribution updating method for symbolic execution. For example, even if the method(s) described are performed in an order other than that described, and/or component(s) of the described systems, structures, devices, circuits, etc. are combined, connected, or combined in other forms than those described, or substituted by other components or equivalents, this(these) may also be an embodiment of the above-described symbolic execution device, symbolic execution method, and/or probability distribution updating method for symbolic execution.

According to the above-described symbolic execution device, symbolic execution method, and probability distribution update method for the symbolic execution, it is possible to reduce the overall number of candidate states in the symbolic execution while maintaining the candidate states necessary for analysis.

According to the above-described symbolic execution device, symbolic execution method, and probability distribution update method for the symbolic execution, the code coverage may be effectively improved by maintaining the appropriate candidate state and removing unnecessary candidate states, and at the same time, the various errors in the program may be easily and more accurately detected.

According to the above-described symbolic execution device, symbolic execution method, and probability distribution update method for the symbolic execution, by removing the appropriate number of candidate states, the search space targeted for the symbolic execution may be effectively and automatically reduced without human intervention.

According to the above-described symbolic execution device, symbolic execution method, and probability distribution update method for the symbolic execution, it is possible to more appropriately update the probability distribution for symbolic execution, thereby improving the accuracy of test results according to the symbolic execution.

According to the above-described symbolic execution device, symbolic execution method, and probability distribution updating method for symbolic execution, because the large number of candidate states are not randomly removed in the symbolic execution, it is also possible to prevent loss of important candidate states, which degrades the program test performance.

What is claimed is:

1. A symbolic execution device comprising:
 a hardware storage unit configured to:
  store at least one of a first probability distribution and a second probability distribution; and
 a hardware processor configured to automatically perform without human intervention:
  i) sampling and obtaining a weight vector from the first probability distribution,
  ii) sampling and obtaining a removal rate from the second probability distribution,
  wherein the sampling and obtaining of i) and ii) are performed simultaneously with transforming at least one candidate state in a set of candidate states of a program to at least one feature vector in symbolic execution of the program,
  adding the weight vector to the at least one feature vector obtained from transforming the at least one candidate state in the symbolic execution to obtain a score for each of the at least one candidate state, and
  performing the symbolic execution of the program with an updated set of the set of candidate states obtained by automatically selecting and removing a first state to be removed from among the at least one candidate state by using the score of each of the at least one candidate state and the removal rate.

2. The symbolic execution device of claim 1, wherein the at least one feature vector includes at least one feature and the at least one feature includes a value indicating whether a specific branch condition exists in a path condition expression of the at least one candidate state.

3. The symbolic execution device of claim 1, wherein the processor is configured to calculate a dot product of the at least one feature vector and the weight vector to obtain a score for each of the at least one candidate state.

4. The symbolic execution device of claim 1, wherein the processor selects a number of candidate states obtained by multiplying a number of the at least one candidate state by the removal rate as a removal target state.

5. The symbolic execution device of claim 1, wherein the processor selects at least one candidate state having a low score as a removal target state.

6. The symbolic execution device of claim 1, wherein the processor generates reachability information data from at least one test case obtained in the_symbolic execution and the reachability information data includes one branch in which the at least one test case is reachable.

7. The symbolic execution device of claim 6, wherein the processor extracts selection data to be used for update from the reachability information data and updates at least one of the first probability distribution and the second probability distribution using the selection data, and the selection data includes a subset of the reachability information data having the smallest number of data reachable for all branches in the program.

8. A symbolic execution method comprising:
 automatically performing without human intervention:
  i) sampling and obtaining a weight vector from a first probability distribution;
  adding the weight vector to the at least one feature vector obtained from transforming at least one candidate state in a set of candidate states of a program to the at least one feature vector in symbolic execution of the program to obtain a score for each of the at least one candidate state;
  ii) sampling and obtaining a removal rate from a second probability distribution, wherein the sampling and obtaining of i) and ii) are performed simultaneously with the transforming; and
  performing the symbolic execution of the program with an updated set of the set of candidate states obtained by automatically selecting and removing a first state to be removed from among the at least one candidate state by using the score of each of the at least one candidate state and the removal rate.

9. The symbolic execution method of claim 8, wherein the at least one feature vector includes at least one feature and the at least one feature includes a value indicating whether a particular branch condition exists in a path condition expression of the at least one candidate state.

10. The symbolic execution method of claim 8, wherein the adding of the weight vector to the at least one feature vector obtained from the at least one candidate state to obtain the score for each of the at least one candidate state includes: calculating a dot product between the at least one feature vector obtained from the at least one candidate state and the weight vector to obtain the score for each of the at least one candidate state.

11. The symbolic execution method of claim 8, wherein the selecting of the state to be removed from among the at least one candidate state by using the score of each of the at least one candidate state and the removal rate includes: selecting a number of candidate states obtained by multiplying a number of the at least one candidate state by the removal rate as a removal target state; and selecting at least one candidate state having a low score as the state to be removed.

12. The symbolic execution method of claim 8, further comprising:
   generating reachability information data from at least one test case obtained in the symbolic execution,
   wherein the reachability information data includes at least one branch in which the at least one test case is reachable.

13. The symbolic execution method of claim 12, further comprising:
   extracting selection data to be used for update from the reachability information data; and
   updating at least one of the first probability distribution and the second probability distribution by using the selection data; wherein the selection data includes a subset of the reachability information data having the smallest number of data reachable for all branches in the program.

\* \* \* \* \*